United States Patent
Tsutsumi

(10) Patent No.: US 7,253,932 B2
(45) Date of Patent: Aug. 7, 2007

(54) IMAGE READING APPARATUS AND IMAGE READING METHOD

(75) Inventor: Kazuyoshi Tsutsumi, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 976 days.

(21) Appl. No.: 10/330,184

(22) Filed: Dec. 30, 2002

(65) Prior Publication Data

US 2004/0125420 A1 Jul. 1, 2004

(51) Int. Cl.
*H04N 1/04* (2006.01)
*H04N 1/40* (2006.01)

(52) U.S. Cl. .................. 358/498; 358/448; 358/461; 358/474

(58) Field of Classification Search ............. 358/498, 358/448, 461, 474, 496; 399/367
See application file for complete search history.

(56) References Cited

U.S. PATENT DOCUMENTS

| | | | |
|---|---|---|---|
| 6,657,751 B1 * | 12/2003 | Maurer et al. | 358/474 |
| 6,958,834 B1 * | 10/2005 | Ide | 358/505 |
| 7,158,267 B2 * | 1/2007 | Chiu | 358/406 |
| 2001/0033397 A1 * | 10/2001 | Kimura | 358/474 |
| 2003/0007197 A1 * | 1/2003 | Kim | 358/497 |
| 2003/0090742 A1 * | 5/2003 | Fukuda et al. | 358/448 |

FOREIGN PATENT DOCUMENTS

| | | | |
|---|---|---|---|
| JP | 05219369 | * | 5/1993 |
| JP | 07203201 | * | 7/1995 |
| JP | 09294207 | * | 9/1997 |
| JP | 11-109521 | | 4/1999 |

* cited by examiner

*Primary Examiner*—Jerome Grant
*Assistant Examiner*—Houshang Safaipour
(74) *Attorney, Agent, or Firm*—Foley & Lardner LLP

(57) ABSTRACT

An image reading apparatus is provided which is capable of preventing abnormal lines from being generated on an image read out from an original document even if there is more or less dirt attached to a reading glass exclusively used for reading ADF original documents. In an image reading apparatus 100 of the present invention, in case of dirt adhering to a reading glass 11, when an original document 13 being sent to a document reading position PW by a transportation part 12 of an automatic document feeder 10 is being read by a scanning carriage 23 through the reading glass 11, abnormal densities appear in pixel data of positions corresponding to the dirt among the readout pixel data. However, a control part 30 of the image reading apparatus 100 nullifies the pixel data of abnormal densities, and compensates for the nullified pixel data based on their surrounding pixel data. As a result, even when dirt adheres to the reading glass, there can be created an excellent image with no missing pixel without appearance of any abnormal black line.

8 Claims, 5 Drawing Sheets

IMAGE READING APPARATUS AND IMAGE READING METHOD

BACKGROUND OF THE INVENTION

1. Field of the Invention

The present invention relates to an image reading method and apparatus, and more particularly, it relates to an image reading apparatus and an image reading method including an automatic document feeder of the sheet-through reading type for sequentially transporting original documents to a document reading position and reading the images of the original documents in an automatic manner.

2. Description of the Related Art

In known image reading apparatuses provided with an automatic document feeder (ADF=Auto Document Feeder) of the sheet-through reading type, when an image of an original document put on a document glass is to be read, a scanning carriage is moved to carry out the reading of the original document image. When the image of the original document is being read out while the original document being transported by means of the ADF, the scanning carriage is moved to an ADF document reading position where the image of the document is read while the scanning carriage is stopped there. In case where an image of an original document is read out in this manner, shading processing is carried out to read a white color that becomes a reference for deciding shades of the image to be read, and after such shading processing is done, the image of the original document is being read while the document is being transported along a reading glass which is arranged at the ADF document reading position for exclusive use for ADF document reading.

With the image reading apparatus as described above in which the image of the original document is being read out (or through read) while the document is being transported along the reading glass, when a speck of dirt (e.g., even dirt just like a point or spot) adheres to the reading glass exclusively used for reading ADF original documents, it appears as an abnormal line extending in a sub scanning direction on the image thus read. If such a line appears upon image formation, there might be the case where the image formed becomes not only unsightly but also unusable for printed matter.

Therefore, when such an abnormal line (e.g., a so-called black stripe) due to dirt appears on the readout image, the user has to clean the reading glass so as to obtain a good quality image, which, however, is troublesome and annoying. In addition, in Japanese patent application laid-open No. Hei 11-109521, a special cleaning mechanism is mounted on an image reading apparatus for detecting and removing dust, stain or the like on a mirror based on an image signal, but in this case, there is a problem of bringing about a lot of cost increase.

SUMMARY OF THE INVENTION

The present invention is intended to solve the problems as referred to above, and has for its object to provide an image reading apparatus and method which are capable of determining and detecting if there is dirt attached to a reading glass exclusively used for reading ADF original documents, by using existing instruments or equipment, as well as such an image reading apparatus and method as capable of preventing abnormal lines from being generated on an image read out from an original document even without the use of any special cleaning mechanism.

In order to solve the above-mentioned problems, the present invention resides in an image reading apparatus comprising: a guide plate for guiding an original document placed at a document reading position; a transportation part for transporting the original document in such a manner that the original document can be guided by the guide plate to pass through the document reading position; a reading glass arranged at the document reading position in opposition to the guide plate; a shading plate arranged at a shading plate reading position; a scanning carriage arranged to freely reciprocatable in such a manner that it is able to read, through the reading glass, the guide plate or the original document that passes through the guide plate at the document reading position, as well as to read the shading plate at the shading plate read position; a control part for controlling the scanning carriage in such a manner that the scanning carriage is moved to the shading plate reading position to read the shading plate, performing shading processing, moving the scanning carriage to the document reading position, reading the guide plate through the reading glass, comparing pixel data obtained when reading the guide plate with pixel data obtained when reading the shading plate, thereby to determine whether there is the presence or absence of abnormal densities in pixel data obtained when reading the guide plate, and determining that reading positions at which the pixel data of abnormal densities have been detected are abnormality occurrence reading positions when it is determined that there is the presence of abnormal densities. According to this construction, when there is dirt adhering to the reading glass for exclusive use for ADF document reading, it is possible to determine and detect such dirt by using existing instruments, so that appropriate measures such as correction, cleaning or the like can be take.

In addition, in the image reading apparatus of the present invention, when it is determined that there is the presence of abnormal densities in the pixel data, the control part reads, at the document reading position, the original document that is being sent to the document reading position by the transportation part, and corrects pixel data that correspond to the abnormality occurrence reading positions among the readout pixel data. With this arrangement, even when dirt adheres to the reading glass, there will not appear any abnormal black line, and it is possible to produce an excellent image without any missing pixel.

Moreover, in the image reading apparatus of the present invention, the control part nullifies the pixel data that correspond to the abnormality occurrence reading positions, estimates possible data for the nullified pixel data by referring to their surrounding pixel data, and compensates for the nullified pixel data with the estimated pixel data. Here, the guide plate comprises a white plate having a white color, and the shading plate comprises a white shading plate that forms a white color.

According to such a construction, pixel data of abnormal densities are nullified, and compensation correction of the nullified data is made based on their surrounding pixel data, whereby even when dirt adheres to the reading glass, there will not appear any abnormal black line, thus making it possible to create an excellent image without any missing pixel.

Further, in the image reading apparatus of the present invention, when it is determined that there is the presence of abnormal densities in the pixel data obtained when reading the guide plate, the control part generates a warning if the number of pixels indicated by the pixel data of abnormal densities is equal to or more than a threshold. Thus, when the dirt on the reading glass is too bad, it is possible to prevent the image reading, the following processing such as printing, etc., from being continued uselessly.

Furthermore, an image reading method according to the present invention comprises: a step of performing shading processing by reading a shading plate arranged at a shading plate reading position; a step of reading a guide plate for an original document arranged in a document reading position through a reading glass; and a step of comparing pixel data obtained when reading the guide plate with pixel data obtained when reading the shading plate, and determining, when the presence of abnormal densities is detected in pixel data obtained upon reading the guide plate, that reading positions at which pixel data of the abnormal densities have been detected are abnormality occurrence reading positions. In this case, the image reading method further comprises: a step of reading, at the document reading position, the original document that is being sent to the document reading position by the transportation part when it is determined that there is the presence of abnormal densities in the pixel data, and correcting pixel data that correspond to the abnormality occurrence reading positions among the readout pixel data. Further, the correction comprises: a step of nullifying pixel data that correspond to the abnormality occurrence reading positions among the readout pixel data; a step of estimating possible data for the nullified pixel data by referring to pixel data surrounding the nullified pixel data; and a step for compensating for the nullified pixel data with the estimated pixel data.

DESCRIPTION OF THE PREFERRED EMBODIMENT

Now, a preferred embodiment of the present invention will be described below in detail while referring to the accompanying drawings.

Figure 1:
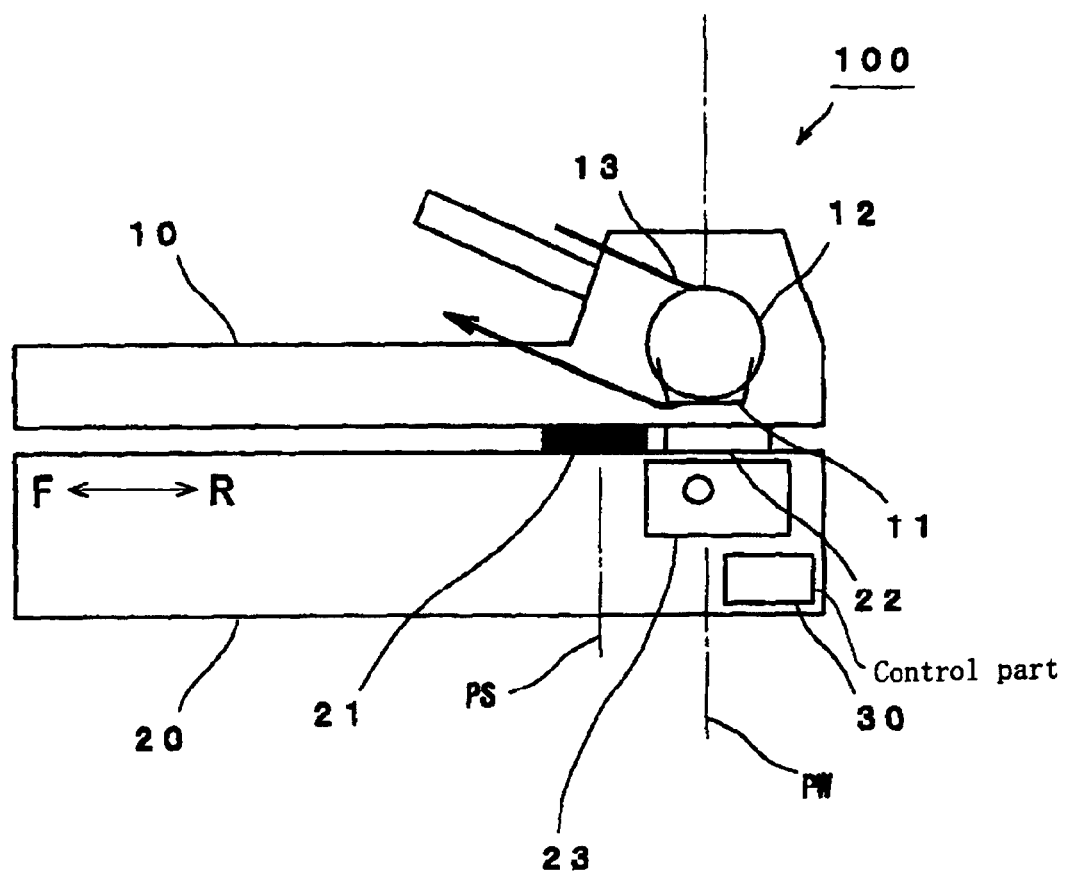
FIG. 1 is a constructional view illustrating an image reading apparatus according to an embodiment of the present invention.
Figure 2A:
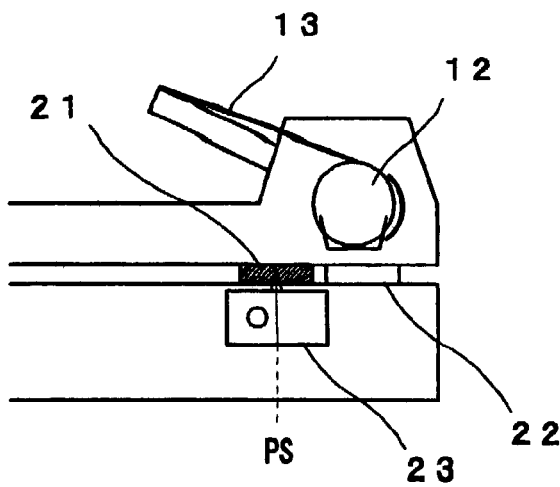
FIG. 2(A) is a view explaining the reading of a white shading plate by means of a scanning carriage of FIG. 1.
Figure 2B:
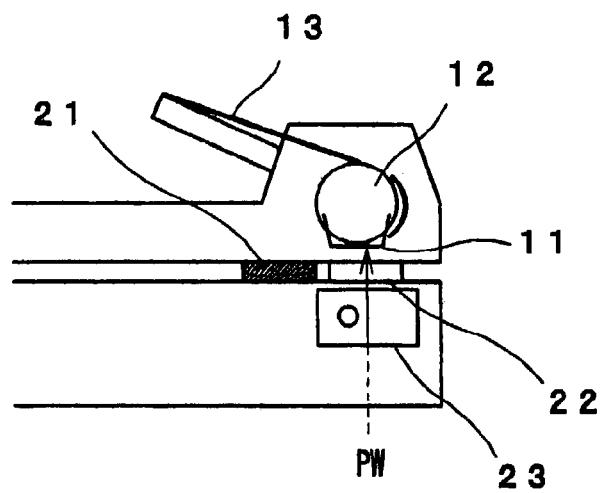
FIG. 2(B) is a view explaining the reading of a white plate by means of the scanning carriage of FIG. 1.
Figure 2C:
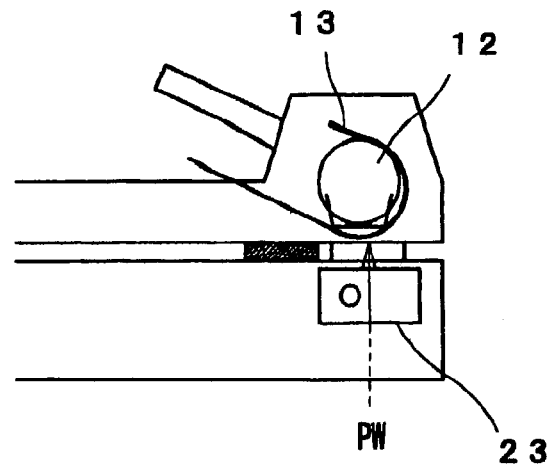
FIG. 2(C) is a view explaining the reading of an original document by means of the scanning carriage of FIG. 1.
Figure 3A:
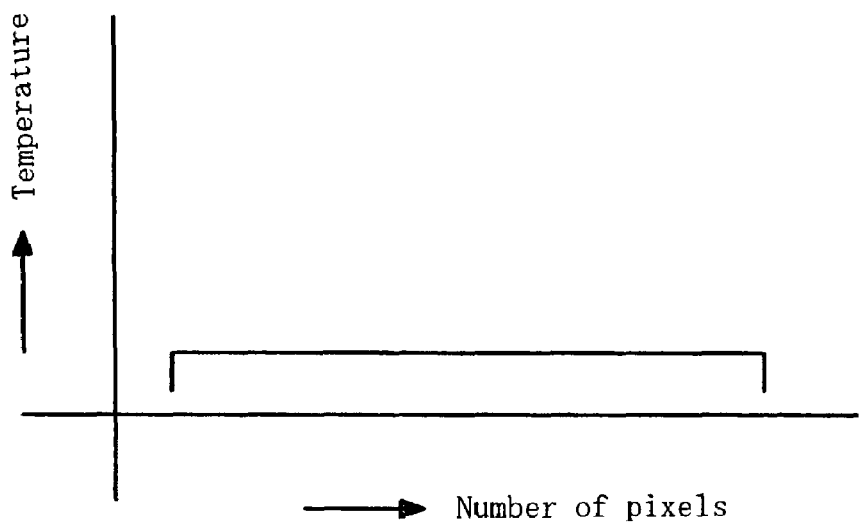
FIG. 3(A) is a view showing pixel data concerning the densities of the white shading plate when the scanning carriage reads the white shading plate in the state of FIG. 2(A).
Figure 3B:
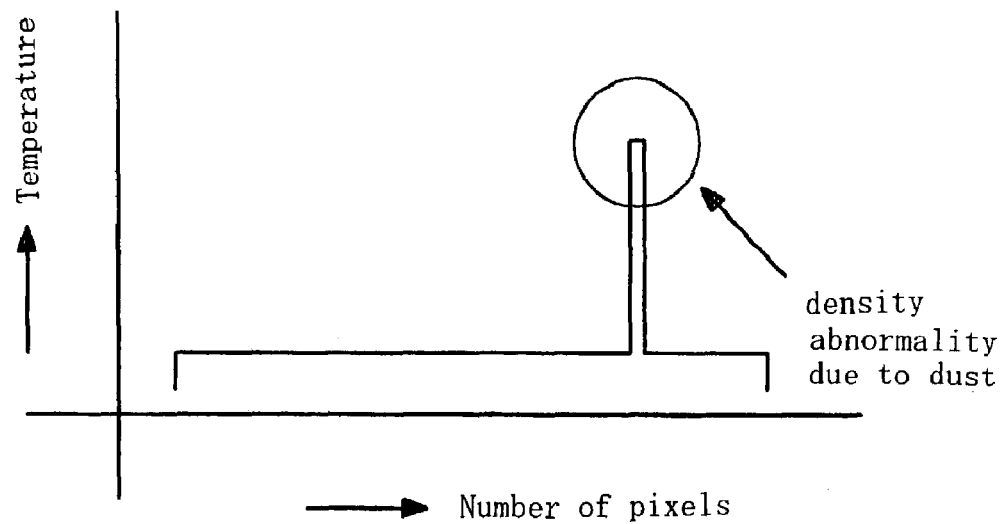
FIG. 3(B) is a view showing that there is found an abnormal density caused in a part of pixels due to dirt when the scanning carriage reads the white plate in the state of FIG. 2(A).
Figure 4:
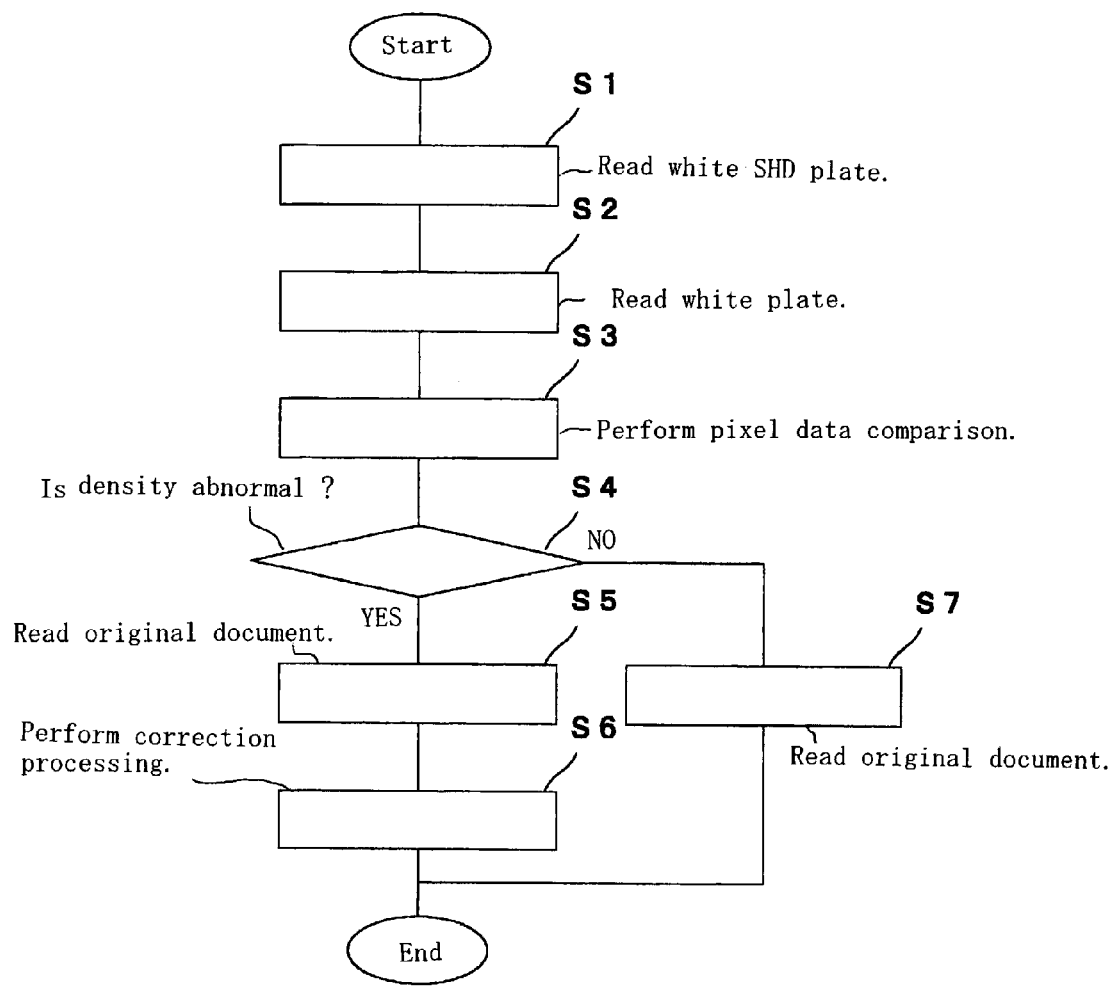
FIG. 4 is a flow chart illustrating the overall operation of this embodiment.
Figure 5:
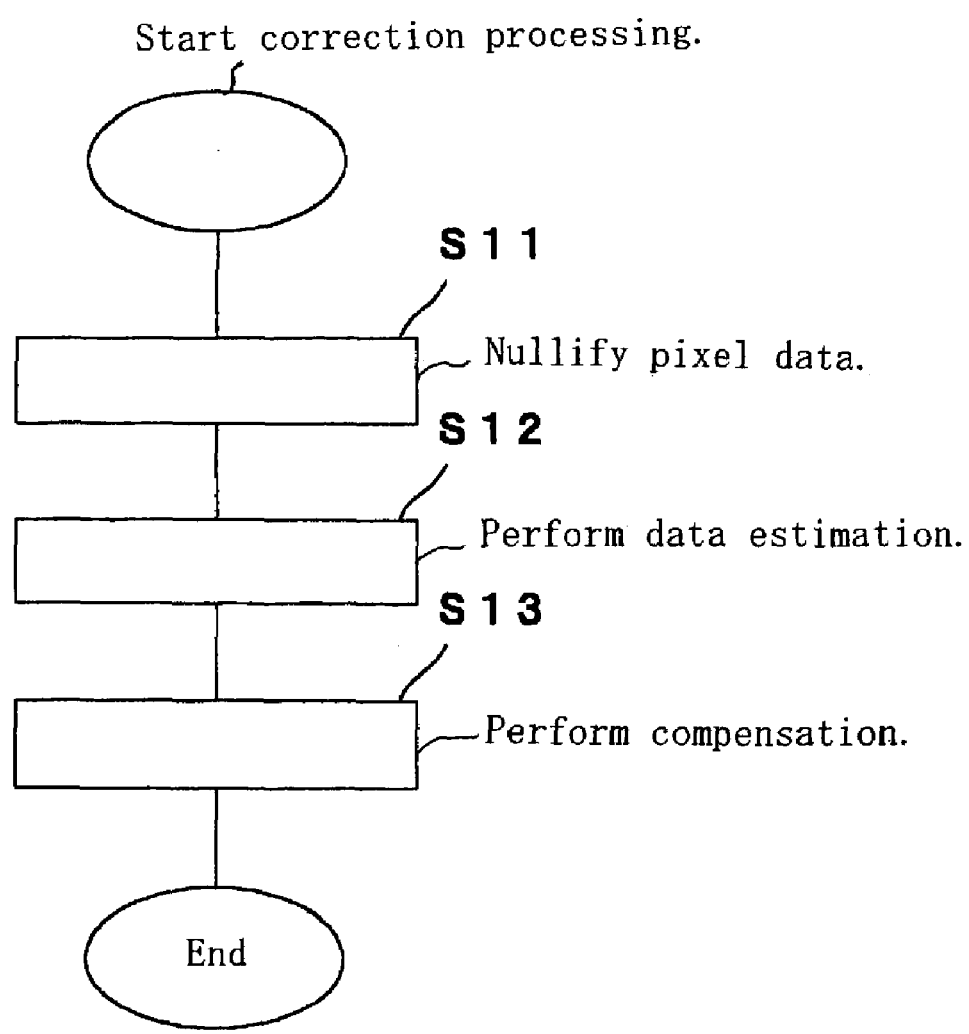
FIG. 5 is a flow chart illustrating correction processing of FIG. 4.

FIG. 1 is a view illustrating the construction of an image reading apparatus according to the present invention. FIG. 2(A) is a view which explains the reading of a white shading plate by means of a scanning carriage of FIG. 1. FIG. 2(B) is a view which explains the reading of a white plate by means of the scanning carriage of FIG. 1. FIG. 2(C) is a view which explains the reading of an original document by means of the scanning carriage of FIG. 1. FIG. 3(A) is a view which shows pixel data concerning the densities of the white shading plate when the scanning carriage reads the white shading plate in the state of FIG. 2(A). FIG. 3(B) is a view which shows that there is found an abnormal density caused in a part of pixels due to dirt when the scanning carriage reads the white plate in the state of FIG. 2(B). FIG. 4 is a flow chart which illustrates the overall operation of this embodiment. FIG. 5 is a view which shows a correction operation.

An image reading apparatus 100 of FIG. 1 is constituted by an automatic document feeder (ADF=Auto Document Feeder) 10 and a scanner unit 20. The automatic document feeder 10 includes a white plate 11 that is arranged at a document reading position PW of the ADF for guiding an original document being sent to the document reading position PW, and a transportation part 12 that cooperates with the white plate 11 to transport the original document 13 in such a manner that the document 13 can be passed through the document reading position PW over the white plate 11. A scanner unit 20 is arranged under the automatic document feeder 10 and is provided on an upper surface thereof with a white shading (SHD) plate 21 arranged at a shading (SHD) plate reading position PS, and a reading glass 22 arranged at the document reading position PW. In addition, the scanner unit 20 is further provided with a scanning carriage 23 which is freely movable in a direction of F and in a direction of R (i.e., sub scanning direction) indicated by arrows along the upper surface of the scanner unit. Note that the white plate 11, the white SHD plate 21, the reading glass 22, the scanning carriage 23 and the like extend in the direction of F or in the direction of R and in a main scanning direction perpendicular to the plane of each drawing sheet.

Next, a description will be made to the control operation of a control part 30 of the image reading apparatus 100 of FIG. 1 while referring to FIG. 2 through FIG. 5. When an instruction for image reading is given to the image reading apparatus 100, the control part 30 provides an instruction to the transportation part 12, whereby a given sheet of original document to be read is transported such that its leading edge comes before the white plate 11, and at the same time the scanning carriage 23 is moved to the SHD plate reading positional PS, as shown in FIG. 2(A). The white SHD plate 21 is read out by the scanning carriage 23 which has been moved to the SHD plate reading positional PS (FIG. 4: step S1), and an image of the SHD plate thus read is subjected to shading processing, so that the image thus processed is assumed to be white that is a reference for deciding the shades of images to be read thereafter. The readout pixel data of the white SHD plate 21 in this case does not have a density variation for the pixels that line up in the main scanning direction, as shown in FIG. 3(A).

After the reading of the white SHD plate 21 has been completed, the control part 30 moves the scanning carriage 23 to the document reading position PW, where the white plate 11 is read through the reading glass 22 by means of the scanning carriage 23 thus moved (step S2 in FIG. 4). If dirt adheres to the reading glass 22 on a reading line thereof, locations of abnormal densities (i.e., location of a high density in this example) appear on the readout data of the white plate 11 in the pixels existing at the positions of the dirt among pixels in the main scanning direction, as shown in FIG. 3(B). The control part 30 compares the data of FIG. 3(B) with the data of FIG. 3(A) (step S3 in FIG. 4), and detects the presence of abnormal densities in the pixel data of FIG. 3(B), whereby it is determined that there is the dirt of a width corresponding to the number of pixels of abnormal densities on the reading glass 22 at the positions at which the presence of abnormal densities is detected (step S4 in FIG. 4).

After the width of the dirt of the reading glass 22 has been detected, the control part 30 controls the transportation part 12 so that the original document 13 is transported to pass through the document reading position PW over the white plate 11, and at the same time, the image of the original document being transported is read out through the reading glass 22 by the scanning carriage 23 that has been moved to the document reading position PW (step S5 in FIG. 4), and the image thus read out is then subjected to correction processing (step S6). In this correction processing, the control part 30 nullifies (or cancels) pixel data comprising the number of pixels corresponding to the dirt in the readout data (step S11 in FIG. 5), compares the nullified pixel data with surrounding or neighboring pixel data of the image thereby to estimate the contents of the nullified pixels (i.e., values of the nullified pixel data) (step S12), compensates for the nullified pixel data with the estimated pixel contents (step S13), and creates an image with no missing pixel. In case, however, the number of pixels corresponding to the dirt is too many and exceeds a prescribed threshold, it is impossible to produce an appropriate image even if a correction is made. Therefore, it is also desirable to notify the user to that effect by generating a warning sound or the like. The subsequent measure is set to perform appropriate processing suitable for the actual situation, such as stopping the reading operation, resuming the reading operation if there is no instruction given within a prescribed period of time, etc.

In the embodiment of the present invention, when an original document being sent to the document reading position by the automatic document feeder is read by the scanning carriage through the reading glass having dirt attached thereto, there appear abnormal densities in the pixel data of the positions corresponding to the dirt among the readout pixel data. However, the control part compares the pixel data obtained by reading the white plate with the pixel data obtained by reading the white shading plate, and detects abnormal densities in the pixel data obtained by reading the white plate, so that the reading positions at which the pixel data of abnormal densities have been detected are determined to be abnormality occurrence reading positions.

Based on the above determination, the control part reads, at the document reading position, the original document that is being sent to the document reading position by the transportation part, following the reading of the white plate, nullifies the pixel data corresponding to the abnormality occurrence reading positions among the readout pixel data, and estimates possible or most likely data for the nullified pixel data by referring to the surrounding or neighboring pixel data. Even when dirt adheres to the reading glass, the control part is able to create an excellent image with no missing pixel without appearance of any abnormal black line by compensating for the nullified pixel data with the estimated pixel data.

In addition, in the above case, when abnormal densities have been detected in the pixel data obtained by reading the white plate, if the number of pixels of the pixel data of abnormal densities is equal to or more than the prescribed threshold, it is possible to prevent the image reading, the following print processing, etc., from being continuously carried out uselessly, by generating a warning in case where the dirt on the reading glass is too bad.

What is claimed is:

1. An image reading apparatus comprising:
    a guide plate for guiding an original document placed at a document reading position;
    a transportation part for transporting the original document in such a manner that the original document can be guided by said guide plate to pass through the document reading position;
    a reading glass arranged at the document reading position in opposition to said guide plate;
    a shading plate arranged at a shading plate reading position;
    a scanning carriage arranged to freely reciprocate in such a manner that it is able to read, through said reading glass, said guide plate or the original document that passes through said guide plate at the document reading position, as well as to read said shading plate at the shading plate read position; and
    a control part for controlling said scanning carriage in such a manner that said scanning carriage is moved to the shading plate reading position to read said shading plate, performing shading processing, moving said scanning carriage to the document reading position, reading said guide plate through said reading glass, comparing pixel data obtained when reading said guide plate with pixel data obtained when reading said shading plate, thereby to determine whether there is the presence or absence of abnormal densities in pixel data obtained when reading said guide plate, and determining that reading positions at which the pixel data of abnormal densities have been detected are abnormality occurrence reading positions when it is determined that there is the presence of abnormal densities.

2. The image reading apparatus as set forth in claim 1, wherein when it is determined that there is the presence of abnormal densities in said pixel data, said control part reads, at the document reading position, the original document that is being sent to the document reading position by said transportation part, and corrects pixel data that correspond to the abnormality occurrence reading positions among the readout pixel data.

3. The image reading apparatus as set forth in claim 2, wherein said control part nullifies the pixel data that correspond to the abnormality occurrence reading positions, estimates possible data for the nullified pixel data by referring to their surrounding pixel data, and compensates for the nullified pixel data with the estimated pixel data.

4. The image reading apparatus as set forth in claim 1, wherein said guide plate comprises a white plate having a white color, and said shading plate comprises a white shading plate that forms a white color.

5. The image reading apparatus as set forth in claim 1, wherein when it is determined that there is the presence of abnormal densities in the pixel data obtained when reading said guide plate, said control part generates a warning if the number of pixels indicated by the pixel data of abnormal densities is equal to or more than a threshold.

6. An image reading method comprising:
    a step of performing shading processing by reading a shading plate arranged at a shading plate reading position;
    a step of reading a guide plate for an original document arranged in a document reading position through a reading glass; and
    a step of comparing pixel data obtained when reading said guide plate with pixel data obtained when reading said shading plate, and determining, when the presence of abnormal densities is detected in pixel data obtained upon reading said guide plate, that reading positions at which pixel data of the abnormal densities have been detected are abnormality occurrence reading positions.

7. The image reading method as set forth in claim 6, further comprising:

a step of reading, at the document reading position, the original document that is being sent to the document reading position by said transportation part when it is determined that there is the presence of abnormal densities in said pixel data, and correcting pixel data that correspond to the abnormality occurrence reading positions among the readout pixel data.

8. The image reading method as set forth in claim 6, wherein said correction comprises:

a step of nullifying pixel data that correspond to the abnormality occurrence reading positions among the readout pixel data;

a step of estimating possible data for said nullified pixel data by referring to pixel data surrounding said nullified pixel data; and a step for compensating for said nullified pixel data with said estimated pixel data.

\* \* \* \* \*